(12) United States Patent
Quigley et al.

(10) Patent No.: US 10,450,933 B2
(45) Date of Patent: Oct. 22, 2019

(54) DOWNSTREAM OXYGEN SENSOR PERFORMANCE FOR SELECTIVE CATALYTIC REDUCTION

(71) Applicant: GM Global Technology Operations LLC, Detroit, MI (US)

(72) Inventors: David P. Quigley, Brighton, MI (US); Pablo E. Hernandez Garcia, Royal Oak, MI (US); Sarah Funk, Canton, MI (US); Madeleine Brancaccio, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 15/645,415

(22) Filed: Jul. 10, 2017

(65) Prior Publication Data
US 2019/0010852 A1    Jan. 10, 2019

(51) Int. Cl.
*F01N 11/00* (2006.01)
*F01N 3/20* (2006.01)
*B01D 53/94* (2006.01)
*F01N 9/00* (2006.01)

(52) U.S. Cl.
CPC .......... *F01N 11/00* (2013.01); *B01D 53/9418* (2013.01); *B01D 53/9495* (2013.01); *F01N 3/2066* (2013.01); *F01N 9/00* (2013.01); *B01D 2255/20723* (2013.01); *B01D 2255/20738* (2013.01); *B01D 2255/20761* (2013.01); *B01D 2255/50* (2013.01); *F01N 2550/02* (2013.01); *F01N 2560/025* (2013.01); *F01N 2610/02* (2013.01); *F01N 2900/0412* (2013.01); *F01N 2900/0416* (2013.01); *F01N 2900/0422* (2013.01); *F01N 2900/08* (2013.01); *F01N 2900/1404* (2013.01); *F01N 2900/1602* (2013.01)

(58) Field of Classification Search
CPC ............. F02D 41/1454; F02D 41/0002; F02D 41/405; F01N 9/2066; F01N 3/0814; F01N 3/0842; F01N 3/2066; F01N 9/00; F01D 41/0235; B01D 53/9418; B01D 53/9495

See application file for complete search history.

(56) References Cited

U.S. PATENT DOCUMENTS

| | | | |
|---|---|---|---|
| 6,185,929 B1 * | 2/2001 | Ishizuka ............ | B01D 53/9495 60/274 |
| 6,651,422 B1 * | 11/2003 | LeGare ................. | F01N 11/002 60/274 |
| 2012/0047875 A1 * | 3/2012 | Hamama ................... | F01N 9/00 60/274 |
| 2014/0220691 A1 * | 8/2014 | Yacoub ................... | F01N 11/00 436/37 |

* cited by examiner

Primary Examiner — Patrick D Maines
(74) Attorney, Agent, or Firm — Cantor Colburn LLP

(57) ABSTRACT

Technical solutions are described for an emissions control system for a motor vehicle including an internal combustion engine. An example computer-implemented method for controlling an exhaust system of an internal combustion engine, includes detecting a high hydrocarbon region in the operation of the internal combustion engine. The method further includes responsively, measuring an upstream temperature of an oxidation device of the exhaust system. Further yet, the method includes in response to the upstream temperature being equal to or above a predetermined threshold, delaying an O2 diagnosis of the exhaust system for a signal rationality delay time.

20 Claims, 6 Drawing Sheets

DOWNSTREAM OXYGEN SENSOR PERFORMANCE FOR SELECTIVE CATALYTIC REDUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. However, if the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

One or more embodiments describe an emissions control system for a motor vehicle including an internal combustion engine. The emissions control system includes an oxidation device, an O2 diagnosis module for diagnosing the oxidation device, and a controller for managing the O2 diagnosis module. For example, the controller manages the O2 diagnosis module by detecting a high hydrocarbon region in the operation of the internal combustion engine. Further, the controller responsively, measures an upstream temperature of the oxidation device. Further yet, the controller in response to the upstream temperature being above a predetermined threshold, delays the O2 diagnosis module for a signal rationality delay time.

Delaying the O2 diagnosis module includes switching the O2 diagnosis module off for the signal rationality delay time. In one or more examples, the signal rationality delay time is a predetermined amount of time. In one or more examples, the signal rationality delay time is determined based on a state of the oxidation device. In one or more examples, determining the signal rationality delay time includes accessing a look-up table corresponding to an oxidation device performance.

In one or more examples, detecting the high hydrocarbon region includes detecting a fueling rate of the internal combustion engine being below a predetermined threshold. Further, detecting the high hydrocarbon region further includes detecting that the upstream temperature is below a second predetermined threshold.

Further one or more embodiments are described for an exhaust system for treating exhaust gas emitted by an internal combustion engine to perform a selective catalytic reduction (SCR) of exhaust gas. The exhaust system includes an O2 diagnosis module to diagnose oxidation performance of the exhaust system. The exhaust system further includes a controller to govern the exhaust system by detecting a high hydrocarbon region in the operation of the internal combustion engine. Further, responsively to detecting the high hydrocarbon region, the controller measures an upstream temperature of an oxidation device of the exhaust system. In response to the upstream temperature exceeding a predetermined threshold, the controller delays the diagnosis module for a signal rationality delay time.

Delaying the O2 diagnosis module includes switching the O2 diagnosis module off for the signal rationality delay time. In one or more examples, the signal rationality delay time is a predetermined amount of time. In one or more examples, the signal rationality delay time is determined based on a state of the oxidation device. In one or more examples, determining the signal rationality delay time includes accessing a look-up table corresponding to an oxidation device performance.

In one or more examples, detecting the high hydrocarbon region includes detecting a fueling rate of the internal combustion engine being below a predetermined threshold. Further, detecting the high hydrocarbon region further includes detecting that the upstream temperature is below a second predetermined threshold.

In one or more examples, the high hydrocarbon region is caused by idling of the internal combustion engine, high altitudes, and the like.

Further, one or more embodiments describe an example computer-implemented method for controlling an exhaust system of an internal combustion engine, includes detecting a high hydrocarbon region in the operation of the internal combustion engine. The method further includes responsively, measuring an upstream temperature of an oxidation device of the exhaust system. Further yet, the method includes in response to the upstream temperature being equal to or above a predetermined threshold, delaying an O2 diagnosis of the exhaust system for a signal rationality delay time.

Delaying the O2 diagnosis module includes switching the O2 diagnosis module off for the signal rationality delay time. In one or more examples, the signal rationality delay time is a predetermined amount of time. In one or more examples, the signal rationality delay time is determined based on a state of the oxidation device. In one or more examples, determining the signal rationality delay time includes accessing a look-up table corresponding to an oxidation device performance.

In one or more examples, detecting the high hydrocarbon region includes detecting a fueling rate of the internal combustion engine being below a predetermined threshold. Further, detecting the high hydrocarbon region further includes detecting that the upstream temperature is below a second predetermined threshold.

In one or more examples, the high hydrocarbon region is caused by idling of the internal combustion engine, high altitudes, and the like.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
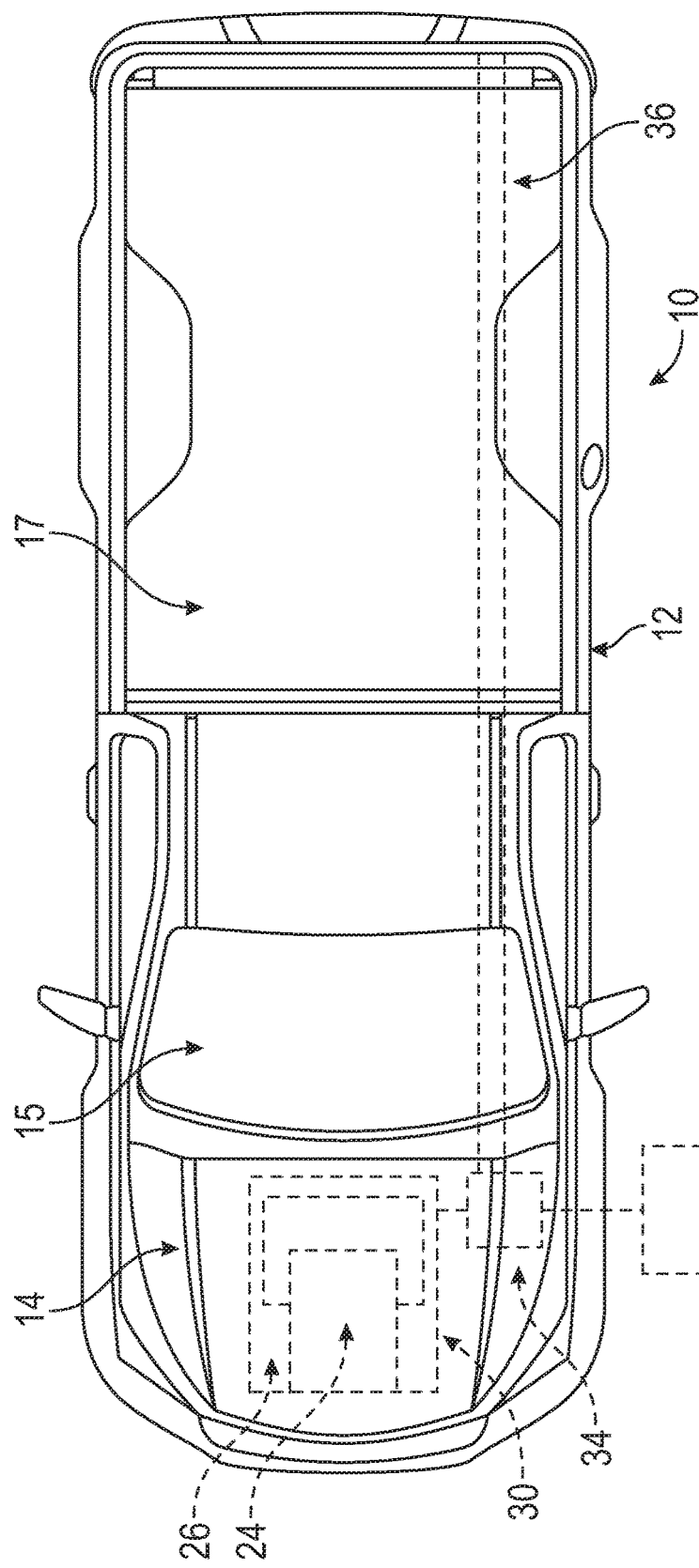
FIG. 1 depicts a motor vehicle including an internal combustion engine and an emission control system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system. 24 can be any engine configuration or application, including various vehicular applications automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
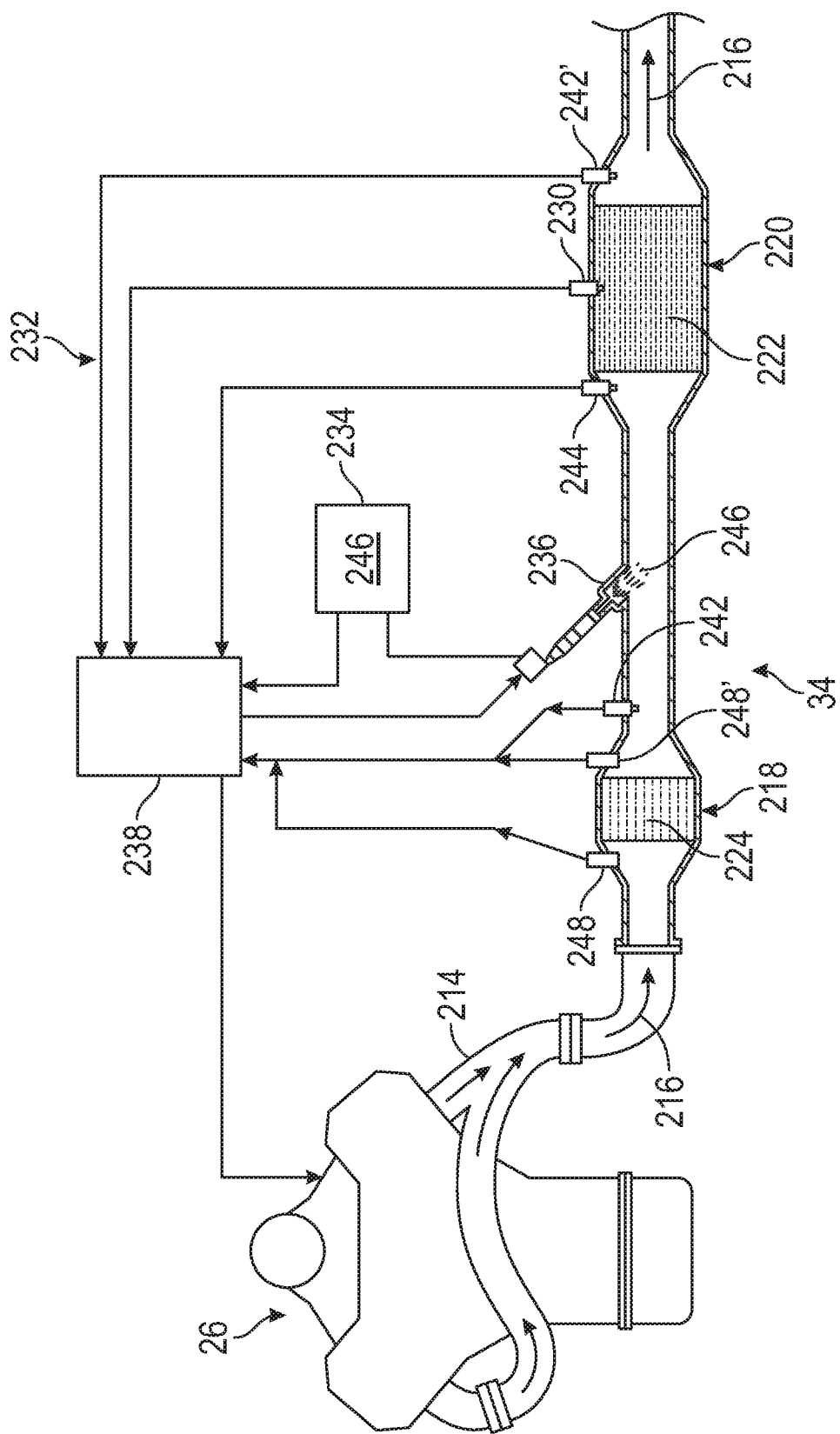
FIG. 2 illustrates example components of an emissions control system according to one or more embodiments.

FIG. 2 illustrates example components of the emissions control system 34 according to one or more embodiments. It should be noted that while the internal combustions engine system 24 includes a diesel engine 26 in the above example, the emissions control system 34 described herein can be implemented in various engine systems. The emissions control system 34 facilitates the control and monitoring of $NO_x$ storage and/or treatment materials, to control exhaust produced by the internal combustion engine system 24. For example, the technical solutions herein provide methods for controlling selective catalytic reduction (SCR) devices, and appurtenant $NO_x$ sensors, wherein the SCR Devices are configured to receive exhaust gas streams from an exhaust gas source. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR Devices are configured to receive reductant, such as at variable dosing rates as will be described below.

An exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of SCRs in addition to particulate filtering capabilities. Alternatively, or in addition, the SCR device 220 can also be coated on a flow through substrate. As can be appreciated, system 34 can include various additional treatment devices, including an oxidation catalyst (OC) devices 218, and particulate filter devices (not shown), among others.

As can be appreciated, the OC device 218 can be of various flow-through, oxidation catalyst devices known in the art. In various embodiments the OC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh)

or other suitable oxidizing catalysts, or combination thereof. The OC device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the SCR device 220, the catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate.

For example, the oxidation device 218 contains palladium, platinum, and/or aluminum oxide, all of which can serve as catalysts to oxidize the hydrocarbons and carbon monoxide with oxygen to form carbon dioxide and water. For example, a chemical model of the oxidation device 218 may be represented as follows.

$$2CO+O_2 \rightarrow 2CO_2 \quad (1)$$

$$C_xH_{2x+2}+[(3x+1)/2]O_2 \rightarrow xCO_2+(x+1)H_2O \quad (2)$$

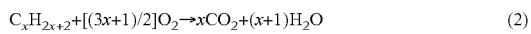

Typically, the control module 238 estimates an HC storage level of the oxidation device 218 based on the chemical model. In addition, the control module 238 uses the readings from an $O_2$ sensor at the inlet of the oxidation device 218. In one or more examples, the control module 238 (or an $O_2$ diagnostic module) compares readings from an $O_2$ sensor at the outlet of the oxidation device 218 with the predicted $O_2$ values based on the chemical model. If the values do not match, the control module 238 (or the diagnostic module) raises an error signal indicative of a failure of the outlet $O_2$ sensor and/or the oxidation device 218.

The SCR device 220 may be disposed downstream from the OC device 218. In one or more examples, the SCR device 220 includes a filter portion 222 that can be a wall flow filter, which is configured to remove carbon and other particulate matter from the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR device 220 receives reductant, such as at variable dosing rates. Reductant 246 can be supplied from a reductant supply source (not shown). In one or more examples, the reductant 246 is injected into the exhaust gas conduit 214 at a location upstream of the SCR device 220 using an injector 236, or other suitable method of delivery. The reductant 246 can be in the form of a gas, a liquid, or an aqueous solution, such as an aqueous urea solution. In one or more examples, the reductant 246 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR device 220 utilizes the reductant 246, such as ammonia ($NH_3$), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of $NH_3$. In one or more examples, a turbulator (i.e., mixer) (not shown) can also be disposed within the exhaust conduit 214 in close proximity to the injector 236 and/or the SCR device 220 to further assist in thorough mixing of reductant 246 with the exhaust gas 216 and/or even distribution throughout the SCR device 220.

The emissions control system 34 further includes a reductant delivery system 232 that introduces the reductant 246 to the exhaust gas 216. The reductant delivery system 232 includes a supply of the reductant 246, an injector 236, and a dosing governor 234. The reductant supply stores the reductant 246 and is in fluid communication with the injector 236 and the dosing governor 234. The reductant 246 may include, but is not limited to, $NH_3$. Accordingly, the injector 236 may inject a selectable amount of reductant 246 into the exhaust gas conduit 214 such that the reductant 246 is introduced to the exhaust gas 216 at a location upstream of the SCR device 220.

In one or more examples, the emissions control system 34 further includes a control module 238 operably connected via a number of sensors to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute a SCR chemical model, as described below. The control module 238 can be operably connected to ICE system 24, SCR device 220, and/or one or more sensors. As shown, the sensors can include an upstream $NO_x$ sensor 242 and downstream $NO_x$ sensor 242', disposed downstream of SCR device 220, each of which are in fluid communication with exhaust gas conduit 214. In one or more examples, the upstream $NO_x$ sensor 242 is disposed downstream of the ICE 26 and upstream of both SCR device 220 and the injector 236. The upstream $NO_x$ sensor 242 and the downstream $NO_x$ sensor 242' detect a $NO_x$ level proximate their location within exhaust gas conduit 214, and generate $NO_x$ signals, which correspond to the $NO_x$ level. A $NO_x$ level can comprise a concentration, a mass flow rate, or a volumetric flow rate, in some embodiments. A $NO_x$ signal generated by a $NO_x$ sensor can be interpreted by control module 238, for example. Control module 238 can optionally be in communication one or more temperature sensors, such as upstream temperature sensor 244, disposed upstream from SCR device 220. In addition, a pair of $O_2$ sensors, an upstream $O_2$ sensor 248 and a downstream $O_2$ sensor 248' monitor $O_2$ levels in the exhaust gasses 216 flowing in and out of the oxidation device 218. The $O_2$ readings from the $O_2$ sensors 248 and 248' are communicated to the control module 238, which in turn uses the readings to ensure the oxidation device 218 is operating in compliance with one or more regulatory requirements, and as predicted by a chemical/performance model of the oxidation device 218.

The sensors of the emissions control system 34 may further include at least one pressure sensor 230 (e.g., a delta pressure sensor). The delta pressure sensor 230 may determine the pressure differential (i.e., Δp) across the SCR device 220. Although a single delta pressure sensor 230 is illustrated, it is appreciated that a plurality of pressure sensors may be used to determine the pressure differential of the SCR device 220. For example, a first pressure sensor may be disposed at the inlet of the SCR device 220 and a second pressure sensor may be disposed at the outlet of the SCR device 220. Accordingly, the difference between the pressure detected by the second delta pressure sensor and the pressure detected by the first delta pressure sensor may indicate the pressure differential across the SCR device 220. It should be noted that in other examples, the sensors can include different, additional, or fewer sensors than those illustrated/described herein.

In one or more examples, the SCR device 220 includes one or more components that utilize the reductant 246 and a catalyst to transform NO and $NO_2$ from the exhaust gases 216. The SCR device 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 216 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR catalyst generally uses the reductant 246 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 246 can be ammonia ($NH_3$), such as anhydrous ammonia or aqueous ammonia, or generated from a nitrogen and hydrogen rich substance such as urea ($CO(NH_2)_2$). Additionally or alternatively, the reductant 246 can be any compound capable of decomposing or reacting in the presence of exhaust gas 216 and/or heat to form ammonia. Equations (3)-(7) provide exemplary chemical reactions for $NO_x$ reduction involving ammonia.

$$6NO+4NH_3 \rightarrow 5N_2+6H_2O \qquad (3)$$

$$4NO+4NH_3+O_2 \rightarrow 4N_2+6H_2O \qquad (4)$$

$$6NO_2+8NH_3 \rightarrow 7N_2+12H_2O \qquad (5)$$

$$2NO_2+4NH_3+O_2 \rightarrow 3N_2+6H_2O \qquad (6)$$

$$NO+NO_2+2NH_3 \rightarrow 2N_2+3H_2O \qquad (7)$$

It should be appreciated that Equations (3)-(7) are merely illustrative, and are not meant to confine the SCR device 220 to a particular NOx reduction mechanism or mechanisms, nor preclude the operation of other mechanisms. The SCR device 220 can be configured to perform any one of the above NOx reduction reactions, combinations of the above NOx reduction reactions, and other NOx reduction reactions.

The reductant 246 can be diluted with water in various implementations. In implementations where the reductant 246 is diluted with water, heat (e.g., from the exhaust) evaporates the water, and ammonia is supplied to the SCR device 220. Non-ammonia reductants can be used as a full or partial alternative to ammonia as desired. In implementations where the reductant 245 includes urea, the urea reacts with the exhaust to produce ammonia, and ammonia is supplied to the SCR device 220. Reaction (6) below provides an exemplary chemical reaction of ammonia production via urea decomposition.

$$CO(NH_2)_2+H_2O \rightarrow 2NH_3+CO_2 \qquad (6)$$

It should be appreciated that Equation (6) is merely illustrative, and is not meant to confine the urea or other reductant 246 decomposition to a particular single mechanism, nor preclude the operation of other mechanisms.

The SCR catalyst can store (i.e., absorb, and/or adsorb) reductant for interaction with exhaust gas 216. For example, the reductant 246 can be stored within the SCR device 220 or catalyst as ammonia. A given SCR device 220 has a reductant capacity, or an amount of reductant or reductant derivative it is capable of storing. The amount of reductant stored within an SCR device 220 relative to the SCR catalyst capacity can be referred to as the SCR "reductant loading", and can be indicated as a % loading (e.g., 90% reductant loading) in some instances. During operation of SCR device 220, injected reductant 246 is stored in the SCR catalyst and consumed during reduction reactions with NOx species and must be continually replenished. Determining the precise amount of reductant 246 to inject is critical to maintaining exhaust gas emissions at acceptable levels: insufficient reductant levels within the system 34 (e.g., within SCR device 220) can result in undesirable NOx species emissions ("NOx breakthrough") from the system (e.g., via a vehicle tailpipe), while excessive reductant 246 injection can result in undesirable amounts of reductant 246 passing through the SCR device 220 unreacted or exiting the SCR device 220 as an undesired reaction product ("reductant slip"). Reductant slip and NOx breakthrough can also occur when the SCR catalyst is below a "light-off" temperature. SCR dosing logic can be utilized to command reductant 246 dosing, and adaptations thereof, and can be implemented by module 238, for example.

A reductant injection dosing rate (e.g., grams per second) can be determined by a SCR chemical model which predicts the amount of reductant 246 stored in the SCR device 220 based on signals from one or more of reductant 246 injection (e.g., feedback from injector 236) and upstream NOx (e.g., NOx signal from upstream NOx sensor 242). The SCR chemical model further predicts NOx levels of exhaust gas 216 discharged from the SCR device 220. The SCR chemical model can be implemented by control module 238. The SCR chemical model can be updatable by one or more process values over time, for example. The dosing governor 234, which is controlled by module 238 in one or more examples, monitors the reductant storage level predicted by the SCR chemical model, and compares the same to a desired reductant storage level. Deviations between the predicted reductant storage level and the desired reductant storage level can be continuously monitored and a dosing adaptation can be triggered to increase or decrease reductant dosing in order to eliminate or reduce the deviation. For example, the reductant dosing rate can be adapted to achieve a desired NOx concentration or flow rate in the exhaust gas 216 downstream of the SCR device 220, or achieve a desired NOx conversion rate. A desired conversion rate can be determined by many factors, such as the characteristics of SCR catalyst type and/or operating conditions of the system (e.g., ICE 26 operating parameters).

In one or more examples, the dosing governor 234 implements the reductant (e.g. urea) dosing control strategy and is used to achieve the maximum NOx conversion (reduce NOx breakthrough) without having excessive NH3 slip from the SCR device 220. During such storage based dosing control, the dosing governor 234 determines a corrective dosing quantity to achieve the $NH_3$ storage setpoint, based on the deviation of the $NH_3$ storage setpoint to the estimated $NH_3$ storage on the SCR device 220.

Over time, inaccuracies of the SCR chemical model can compound to appreciative errors between modeled SCR reductant loading and actual loading. Accordingly, the SCR chemical model can be continuously corrected to minimize or eliminate errors. One method for correcting an SCR chemical model includes comparing the modeled SCR discharge exhaust gas NOx levels to the actual NOx levels (e.g., as measured by downstream NOx sensor 242') to determine a discrepancy, and subsequently correcting the model to eliminate or reduce the discrepancy. Because NOx sensors (e.g., downstream NOx sensor 242') are cross-sensitive to reductant (e.g., $NH_3$) and $NO_x$, it is critical to distinguish between reductant signals and NOx signals as reductant slip can be confused with insufficient NOx conversion.

In one or more examples, a passive analysis technique used to distinguish between reductant signals and NOx signals is a correlation method which includes comparing the upstream NOx concentration (e.g., such as measured by upstream NOx sensor 242) measurement with the downstream NOx concentration (e.g., such as measured by downstream NOx sensor 242'), wherein diverging concentration directions can indicate an increase or decrease in reductant slip. For example, if the upstream NOx concentration decreases and downstream NOx concentration increases, reductant slip can be identified as increasing. Similarly, if the upstream NOx concentration increases and downstream NOx concentration decreases, reductant slip can be identified as decreasing. Alternatively, or in addition, a second passive analysis technique used to distinguish between reductant signals and NOx signals is a frequency analysis. NOx signals generated by NOx sensors can include multiple frequency components (e.g., high frequency and low frequency) due to the variation of the NOx and reductant concentrations during transient conditions. High frequency signals generally relate only to NOx concentration, while low frequency signals generally relate to both NOx concentration and reductant concentration. High frequency signals for upstream NOx and downstream NOx are isolated and used to calculate a SCR NOx conversion ratio, which is then applied to the isolated low pass upstream NOx signal to determine a low frequency downstream NOx signal. The calculated low frequency downstream NOx signal is then compared to the actual isolated low frequency downstream NOx signal, wherein a deviation between the two values can indicate reductant slip.

A drawback of passive analysis techniques such as the correlation method and frequency method described above is that they rely on the proper operation of two NOx sensors. For example, a faulty upstream NOx sensor (e.g., upstream NOx sensor 242) can generate a NOx signal which is lower than the actual NOx level proximate the upstream NOx sensor causing the SCR chemical model to predict higher reductant storage than the actual storage. Accordingly, NOx breakthrough would be incorrectly identified as reductant slip, and reductant dosing would be commanded such that NOx breakthrough would be exacerbated (i.e., reductant dosing would be decreased). Further, the SCR chemical model would be updated using the inaccurate upstream NOx measurement, and the exacerbated NOx breakthrough would endure. Additionally or alternatively, in a similar manner an $NH_3$ slip can be incorrectly interpreted as NOx breakthrough.

Another drawback of the correlation and frequency passive analysis techniques is that they cannot be implemented while the SCR is in steady state. "Steady state" is determined, for example, by taking the root mean square value of a NOx signal upstream from SCR device 220 (e.g., such as measured by upstream NOx sensor 242) over a moving time frame; a sufficiently small value indicates a minimal variation in upstream NOx concentration and the SCR can be considered to be in steady state. For example, a steady state condition can be comprise a root mean square value of the upstream NOx concentration of less than a predetermined value, such as about 30 ppm, less than about 20 ppm, or less than about 10 ppm. SCR steady state conditions can often correlate with ICE 26 steady state conditions (e.g., generally consistent RPM, fuel injection, temperature, etc.) Intrusive tests can be used to distinguish between reductant signals and NOx signals, which include halting all or most reductant dosing for a period of time. While intrusive tests can be performed under steady state conditions, they can, in some circumstances, yield undesirable exhaust emissions during the test period, such as emissions with an increased NOx concentration.

Figure 3:
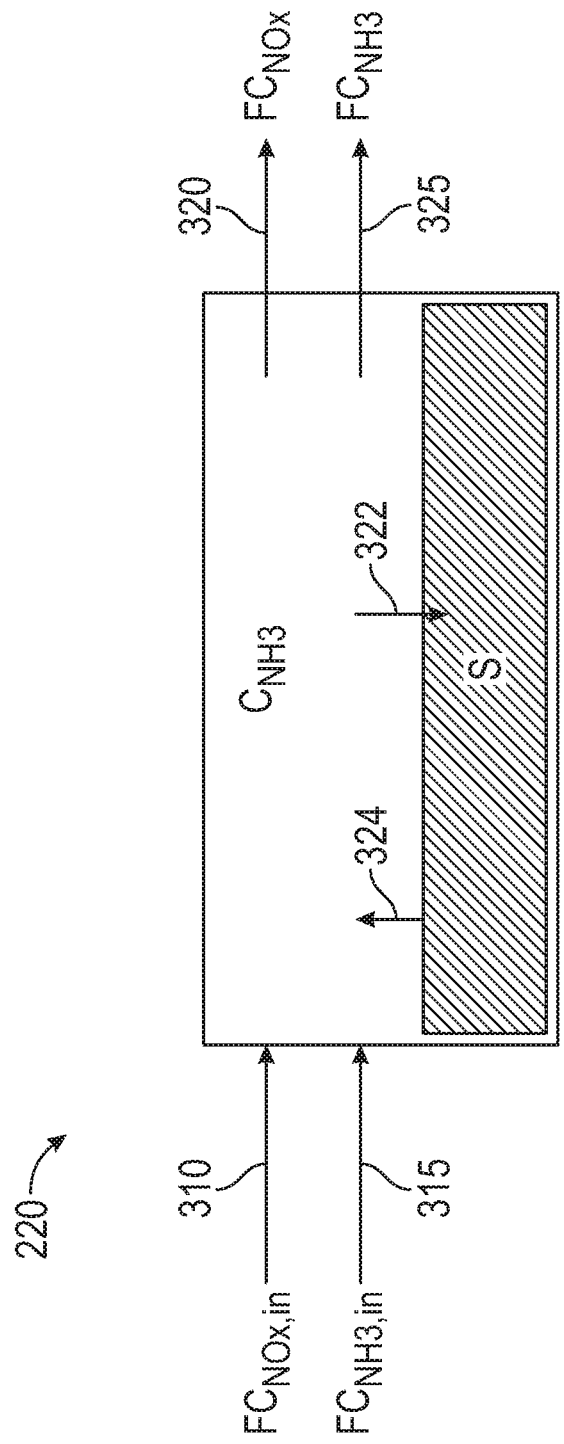
FIG. 3 illustrates an example flow of the gases through an SCR device, according to one or more embodiments.

FIG. 3 illustrates an example flow of the exhaust gas through the SCR device 220, according to one or more embodiments. The control module 238 measures the flow rate (F) of gas volume, and concentration C of the gas. For example, the SCR device 220 determines an input flow-rate of NOx 310 as $FC_{NOx,in}$, where F is the volume of the incoming gas 216, and $C_{NOx,in}$ is the inlet concentration of NOx in the incoming gas 216. Similarly, $FC_{NH3,in}$ is the volume of the flow-rate of $NH_3$ 315 in the incoming gas 216, $C_{NH3,in}$ being the inlet concentration of $NH_3$. Further, compensating for the amount of adsorption 322 and amount of desorption 324, and the amounts reacted on the catalyst surface, the control module 238 may determine $C_{NH3}$ as the SCR concentration of $NH_3$, and $C_{NOx}$ as SCR concentration of NOx.

Accordingly, $FC_{NOx}$ is the NOx outlet volume flow rate 320 of $NO_x$ through the outlet of the SCR device 220. In one or more examples, the control module 238 may determine $W_{NOx}FC_{NOx}$ as mass flow rate of NOx, where $W_{NOx}$ is the molecular weight of NOx. Similarly, for $NH_3$, the outlet volume flow rate 325 is $FC_{NH3}$ with the mass flow rate of $NH_3$ being $W_{NH3}FC_{NH3}$.

As described earlier, the control module 238, via the dosing governor 234, controls the reductant injection rate precisely; such as ammonia producing urea aqueous solution injection rate. An insufficient injection may result in unacceptably low NOx conversions. An injection rate that is too high results in release of ammonia to the atmosphere. These ammonia emissions from SCR systems are known as ammonia slip.

Accordingly, referring back to FIG. 2, the control module 238 controls operation of the injector 236 based on the chemical model and desired $NH_3$ storage setpoint to determine an amount of reductant 246 to be injected as described herein. The control module 238 may determine a correction coefficient corresponding to the reductant storage based on monitoring the one or more sensors, and may more precisely control the amount of injected reductant provided by the injector 236. For example, the control module 238 determines a reductant injector energizing time correction coefficient to further reduce or eliminate discrepancy between the chemical model and actual SCR outlet NOx emissions. Alternatively, or in addition, the control module 238 determines a $NH_3$ set-point correction to reduce or eliminate discrepancy between the chemical model and actual SCR outlet NOx emissions. Accordingly, the supply of reductant 246 may be utilized more efficiently. For example, the reducing agent injected into the exhaust gas 216 may form $NH_3$ when injected into the exhaust gas 216. Accordingly, the control module 238 controls an amount of $NH_3$ supplied to the SCR device 220. The SCR catalyst adsorbs (i.e., stores) $NH_3$. The amount of $NH_3$ stored by the SCR device 220 may be referred to hereinafter as an "$NH_3$ storage level." The control module 238 may control the amount of $NH_3$ supplied to the SCR device 220 to regulate the $NH_3$ storage level. $NH_3$ stored in the SCR device 220 reacts with NOx in the exhaust gas 216 passing therethrough.

In one or more examples, the percentage of NOx that is removed from the exhaust gas 216 entering the SCR device 220 may be referred to as a conversion efficiency of the SCR device 220. The control module 238 may determine the conversion efficiency of the SCR device 220 based on $NOx_{in}$ and $NOx_{out}$ signals generated by the first (upstream) NOx sensor 242 and second (downstream) NOx sensor 242' respectively. For example, the control module 238 may determine the conversion efficiency of the SCR device 220 based on the following equation:

$$SCR_{eff} = (NOx_{in} - NOx_{out})/NOx_{in} \qquad (7)$$

$NH_3$ slip can also be caused because of an increase in the temperature of the SCR catalyst. For example, $NH_3$ may desorb from the SCR catalyst when the temperature increases at times when the $NH_3$ storage level is near to the maximum $NH_3$ storage level. $NH_3$ slip may also occur due to an error (e.g., storage level estimation error) or faulty component (e.g., faulty injector) in the emissions control system 34.

Typically, the control module 238 estimates an $NH_3$ storage level of the SCR device 220 based on the chemical model. In one or more examples, the $NH_3$ storage set-point ("set-point") is calibrate-able. The control module 238 uses the chemical model to estimate the current storage level of $NH_3$ in the SCR device 220, and the storage level governor 234 provides feedback to the injection controls to determine the injection rate to provide $NH_3$ for reactions according to the chemical model and to maintain a target storage level. The set-point may indicate a target storage level "S". The control module 238 controls the reductant injector 236 to manage the amount of reducing agent injected into the exhaust gas 216 to adjust the storage level of the SCR device 220 to the set-point. For example, the control module 238 commands the injector 236 to increase or decrease the storage level to reach the set-point when a new set-point is determined. Additionally, the control module 238 commands the reductant injector 236 to increase or decrease the storage level to maintain the set-point when the set-point has been reached.

In one or more examples, in an overrun condition of the ICE 26, the downstream NOx sensor 242' is diagnosed for downstream $O_2$ sensor performance. For example, the overrun condition represents a time at which the vehicle 10 travels without throttle or travels while no fuel is delivered to the cylinders of the ICE 26. For example, an overrun condition may occur, for example, when a brake is applied to slow the vehicle to a stop (i.e. a coast-down event), or when the vehicle is traveling down-hill.

During operating conditions near overrun, where fueling is lighter (downhill, long idle), the engine out Hydrocarbons (HC) increase (above a predetermined threshold) and the exhaust system 30 temperature drops, which can cause the HC to be stored in the oxidation device 218. Further, when the ICE 26 returns to a higher load the temperature of the oxidation device 218 increases and the stored HC is oxidized from the oxidation device 218. Because of such oxidation of the stored HC, the downstream $O_2$ reading can have a lower than anticipated reading, which in turn leads to a false diagnostic failure signals from one or more diagnostic modules monitoring the $O_2$ readings from the sensors. The technical solutions described herein address such technical challenges. In one or more examples, the technical solutions facilitate the control module 238 to prevent diagnosing the $O_2$ reading error signal if the signal is raised because of the stored HC being oxidized.

Figure 4:
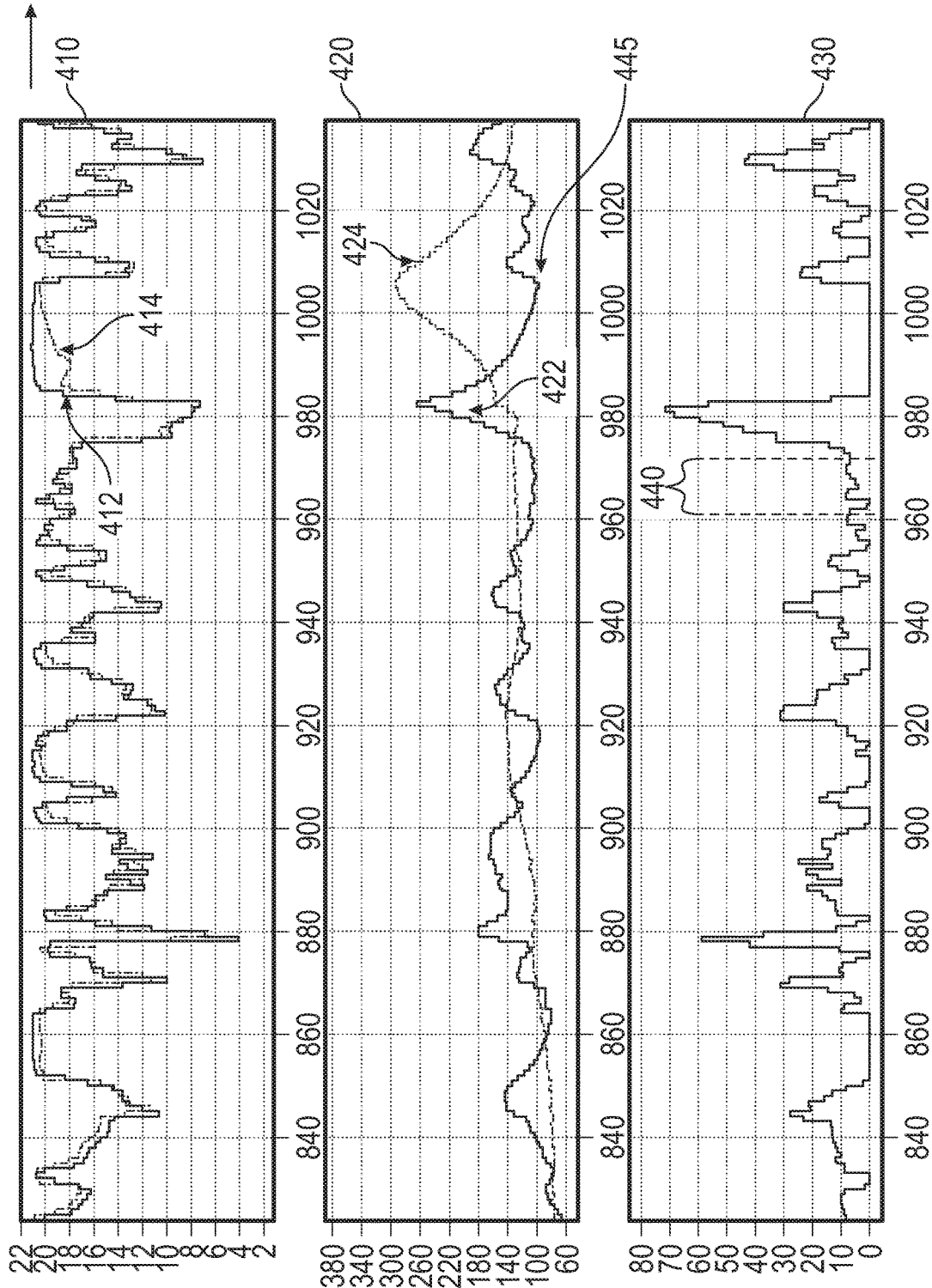
FIG. 4 depicts an example overrun condition and a consequent $O_2$ diagnostic error signal according to one or more embodiments.

FIG. 4 depicts an example overrun condition and a consequent $O_2$ diagnostic error signal according to one or more embodiments. The upstream and downstream $O_2$ readings 410, relative to the oxidation device 218 are depicted. The upstream and downstream $O_2$ readings 410 indicate that the upstream $O_2$ readings 412 are lower compared to the $O_2$ readings 414. Further, FIG. 4 depicts oxidation device upstream temperature readings 422 and downstream temperature readings 424 in a temperature plot 420 and a plot for fueling rate 430 into the ICE 26. FIG. 4 further indicates a high HC region 440 that represents low engine fueling rates 430, low exhaust gas temperatures 420. In one or more examples, the HC region 440 also represents low ambient temperatures. For example, the high HC region 440 may be relatively larger at higher altitudes compared to lower altitudes. As the fueling rate 430 increases, the temperature of the oxidation device 218 increases (424), ending the high HC region 440, and the stored HC is oxidized from the oxidation device 218 (445). While this is occurring, the downstream $O_2$ reading 414 has a lower than anticipated reading, compared to the upstream $O_2$ reading 412 due to the HC burning off the oxidation device 218 leading to the false error signal.

The technical solutions herein prevent such false $O_2$ reading error signal by monitoring one or more parameters, such as the exhaust gas temperatures 420, the fueling rate 430, ambient temperature, ambient pressure, time at fueling levels, among others to detect the high HC region 440. Further, the technical solutions facilitate the control module 238 to determine a signal rationality delay duration (i.e. time) for diagnosing one or more $O_2$ sensor (e.g., the downstream $O_2$ sensor 248) during an overrun condition. The signal rationality delay time delays the time at which the downstream $O_2$ sensor reading 414 is diagnosed. In this manner, misdiagnosis of the downstream $O_2$ sensor 248' caused by consumed $O_2$ that can occur during an overrun condition is avoided.

Figure 5:
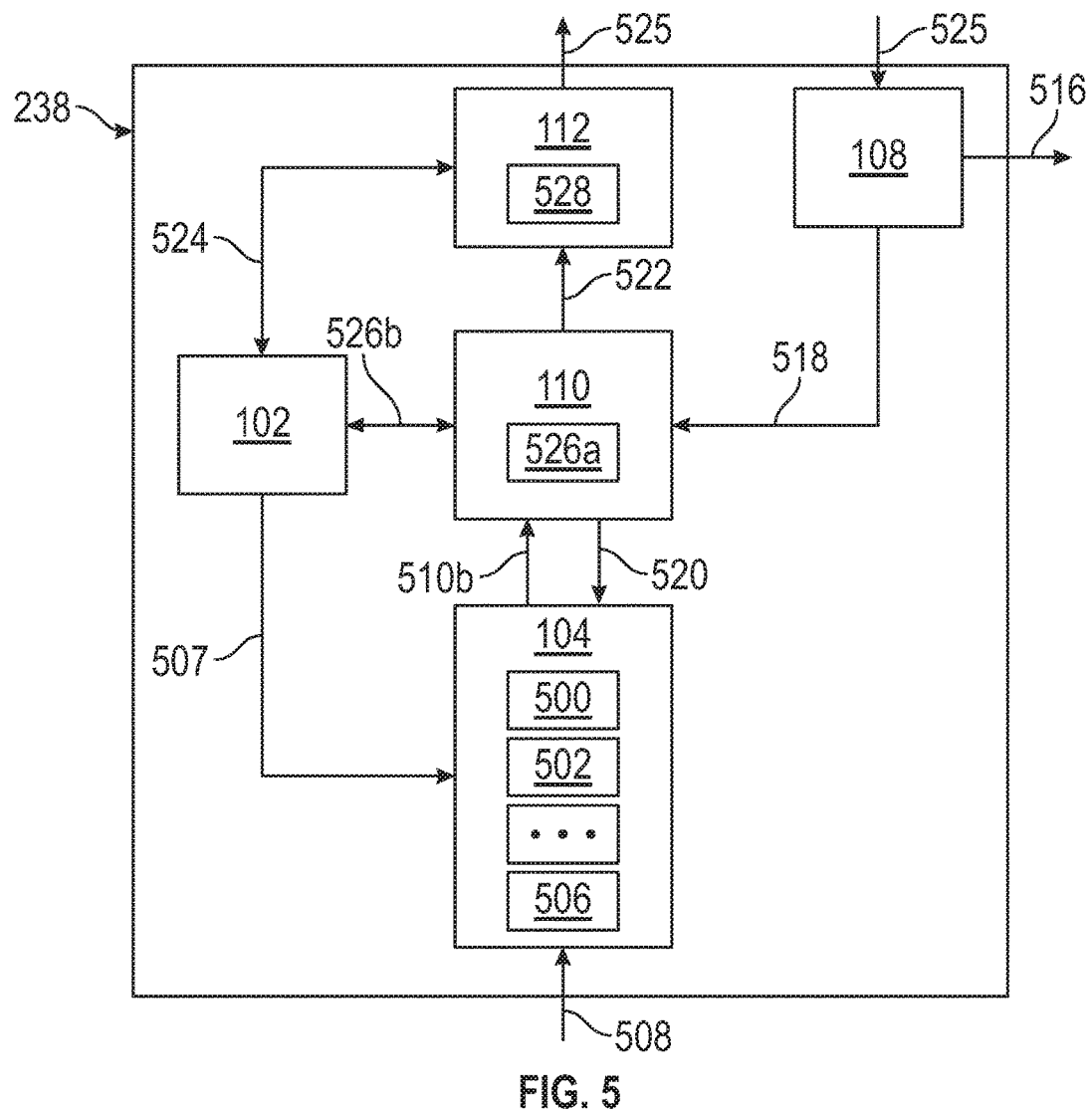
FIG. 5 depicts a block diagram of an example control module according to one or more embodiments.

FIG. 5 depicts a block diagram of the control module 238 that determines one or more signal rationality delay times before diagnosing performance of an $O_2$ sensor during an overrun condition according to one or more embodiments. Although the following embodiment is described in terms of diagnosing the downstream $O_2$ sensor 248' during a coast-down overrun event, the technical solutions are not limited thereto. Various embodiments of the exhaust gas treatment system 30 of FIG. 2 according to the present disclosure may include any number of sub-modules embedded within the control module 238. As can be appreciated, the sub-modules shown in FIG. 5 may be combined or further partitioned as well. Inputs to the control module 238 may be sensed from the exhaust gas treatment system 30, received from other control modules, for example an engine control module (not shown), or determined by other sub-modules.

As illustrated in FIG. 5, the control module 238 according to at least one embodiment includes a memory 102, an oxidation storage module 104, a reductant injector control module, a fuel injector control module 108, a signal rationality delay module 110, and an O2 sensor diagnosis module 112. Each of the modules 104-112 may include a respective memory unit configured to store values, parameters and/or data models as needed. In addition, each of the modules 104-112 may interface and electrically communicate with the memory 102 to retrieve and update stored values, parameters and/or data models as needed.

According to one or more embodiments, the memory 102 stores one or more threshold values, time periods over which the temperatures were measured, a number of configurable limits, maps, data values, variables, temperature models, and system models used to control the exhaust system 30. The memory 102 may also store one or more temperature thresholds and/or temperature threshold ranges corresponding to a respective soot combustion temperature. In addition, the memory 102 may store one or more temperature models for determining the oxidation temperature, the SCR temperature, and other values associated with the exhaust system 30. For example, the temperatures are modeled according to temperature signals generated by one or more of the temperature sensors and one or more temperature models stored in the memory 102.

The oxidation storage module 104 determines the performance of the oxidation device 218 based on various operating conditions 508 determined by various temperature sensors and/or models. An oxidation performance model 507 may be obtained from memory and/or may be generated according to outputs from various sub-models including, but not limited to, a HC conversion model 500, a $CO_2$ conversion model 502, and the like. The sub-models 500-506 may utilize various operating conditions 508 determined by various temperature sensors and/or models. The HC conversion model 500 may be based on, for example, age of the oxidation device 218, the oxidation device temperature, exhaust flow rate, oxidation inlet $O_2$ ratio, HC storage on the oxidation device 218, and inlet $CO_2$ concentration. The $CO_2$ conversion 502 may be based on, for example, the oxidation device temperature, exhaust flow rate, inlet $CO_2$ concentration, and HC storage on the oxidation device 218.

Various driving conditions may create operating conditions 508 (e.g., instant temperature of the oxidation device 218, temperature gradient of the oxidation device 218, ambient temperature, exhaust gas and engine fueling, exhaust flow, ambient pressure, time at fueling levels etc.) that cause $O_2$ consumption to vary. During a coast-down event, for example, the oxidation performance model inputs various oxidation device operating parameters including, but not limited to, exhaust flow rate and oxidation device temperature. Based on the oxidation device parameters, the oxidation storage module 104 outputs one or more oxidation device performance values 510 which indicate amount of $O_2$ the oxidation device 218 is likely to release during the current coast-down event.

The fuel injector module 108 receives one or more driving condition signals 514 indicating a current driving condition of the vehicle. The driving condition signals 514 may include, but are not limited to, a throttle position signal, a mass airflow intake signal, and a brake position signal. The throttle position signal and the mass airflow intake signal may indicate a fuel transient condition such as, for example, an acceleration event. The brake position signal may indicate an overrun condition such as, for example, a coast-down event. Based on the driving condition signal 514, the fuel injector module 108 outputs a fuel control signal 516 to one or more fuel injectors 14. During a coast-down event, for example, the fuel injector may command no fuel be injected. The fuel injector module 108 is also in electrical communication with the signal rationality delay module 110, and outputs a fuel injector status signal 518 indicating the amount of fuel injected by the fuel injector 14. According to an embodiment, the fuel injector status signal 518 may be output, for example, to indicate that no fuel is injected by the fuel injector 14 at a particular time. In this manner, the signal rationality delay module 110 may detect a coast-down event (i.e. an overrun condition).

The signal rationality delay module 110 is in electrical communication with the oxidation performance module 104 and the $O_2$ diagnosis module 112. When the signal rationality delay module 110 determines that a coast-down event exists and/or the high HC region 440, the signal rationality delay module 110 outputs a status request signal 520 to the oxidation performance module 104 and requests a performance status of the oxidation device 218. In response to the status request signal, the oxidation performance module 104 generates one or more oxidation performance values 510b that indicate an amount of $O_2$ the oxidation device 218 is expected to release during the current coast-down event. The oxidation performance values 510b may also include an estimate of an expected amount of $O_2$ to be released during the current coast-down event.

According to an embodiment, the signal rationality delay module 110 waits (or delays) until an oxidation performance value 510b indicates that that no $O_2$ reading was reduced because of the high HC region 440. In response to determining that the lower $O_2$ reading is not predicted, the signal rationality delay module 110 outputs a diagnostic control signal 522. It is appreciated that in another embodiment a small level of $O_2$ may be tolerated based on a tolerable threshold value. The diagnostic control signal 522 commands the O2 diagnosis module 112 to diagnose the downstream $O_2$ sensor 248'.

The $O_2$ diagnosis module 112 is in electrical communication with the signal rationality delay module 110 and waits until receiving the diagnostic control signal 522 before diagnosing the downstream $O_2$ sensor 248'. According to an embodiment, the $O_2$ diagnosis module 112 retrieves one or more $O_2$ threshold values 524 (e.g., 20 PPM) from the memory 102. In response to receiving the diagnostic control signal 522, the $O_2$ diagnosis module 112 determines a difference between the $O_2$ output determined by the downstream O2 sensor 248' and a zero-point value, and an $O_2$ diagnosis signal 525 is output based on the comparison. For example, when the difference exceeds the predetermined $O_2$ output threshold, the O2 diagnosis module 112 outputs an $O_2$ diagnostic signal 525 indicating that an $O_2$ sensor fault is determined. Otherwise, the $O_2$ diagnosis module 112 may output the diagnostic signal 525 indicating that an $O_2$ sensor pass is determined.

According to one or more embodiments, the difference is compared to a differential threshold, for example 5 ppm, and the $O_2$ diagnostic signal 525 is output based on the comparison. When the difference exceeds the differential threshold, the $O_2$ diagnosis module 112 outputs the $O_2$ diagnostic signal 525 indicating that a oxidation system fault is determined, which may be a fault in the $O_2$ sensors or the oxidation device 218. Otherwise, the $O_2$ diagnosis module 112 may output the diagnostic signal 525 indicating that an $O_2$ sensor pass is determined. It is appreciated that a fault alert may be generated when a number of detected faults exceeds a fault threshold. In this manner, a misdiagnosis of the downstream $O_2$ sensor 248' resulting from high HC region 440 during certain overrun conditions may be avoided.

According to one or more embodiments, the signal rationality delay module 110 dynamically determines a signal rationality delay time based on a status of the oxidation device 218. For example, the signal rationality delay module 110 stores a lookup table (LUT) 526a that cross-references various predetermined oxidation performance values with a respective signal rationality delay time. According to another embodiment, an LUT 526b may also be retrieved from memory 102. Based on one or more oxidation performance values 510b provided by the oxidation performance module 104, the signal rationality delay module 110 selects a respective signal rationality delay time, and outputs the selected signal rationality delay time to the $O_2$ diagnosis module 112 via the diagnostic control signal 522. In this manner, the signal rationality delay time may be dynamically determined as the performance of the oxidation device 218 changes.

The $O_2$ diagnosis module 112 receives the diagnostic control signal 522 and sets a time threshold equal to the signal rationality delay time selected by the signal rationality delay module 110. After setting the time threshold, the $O_2$ diagnosis module 112 initiates a timer 528. When the timer 528 exceeds the time threshold (i.e. the signal rationality delay time), the $O_2$ diagnosis module 112 executes/diagnoses the oxidation system, including the upstream $O_2$ sensor 248, the oxidation device, and the downstream $O_2$ sensor 248', among other components. For example, when the difference $O_2$ output exceeds the predetermined $O_2$ output threshold (e.g., 20 ppm) an $O_2$ sensor fault is determined. It is appreciated that a fault alert may be generated when a number of detected faults exceeds a fault threshold. As described above, the signal rationality delay time is dynamically determined before diagnosing the downstream $O_2$ sensor 248' during an engine overrun condition (e.g., a coast-down event). Accordingly, a more accurate diagnosis of the downstream $O_2$ sensor 248' is achieved.

Figure 6:
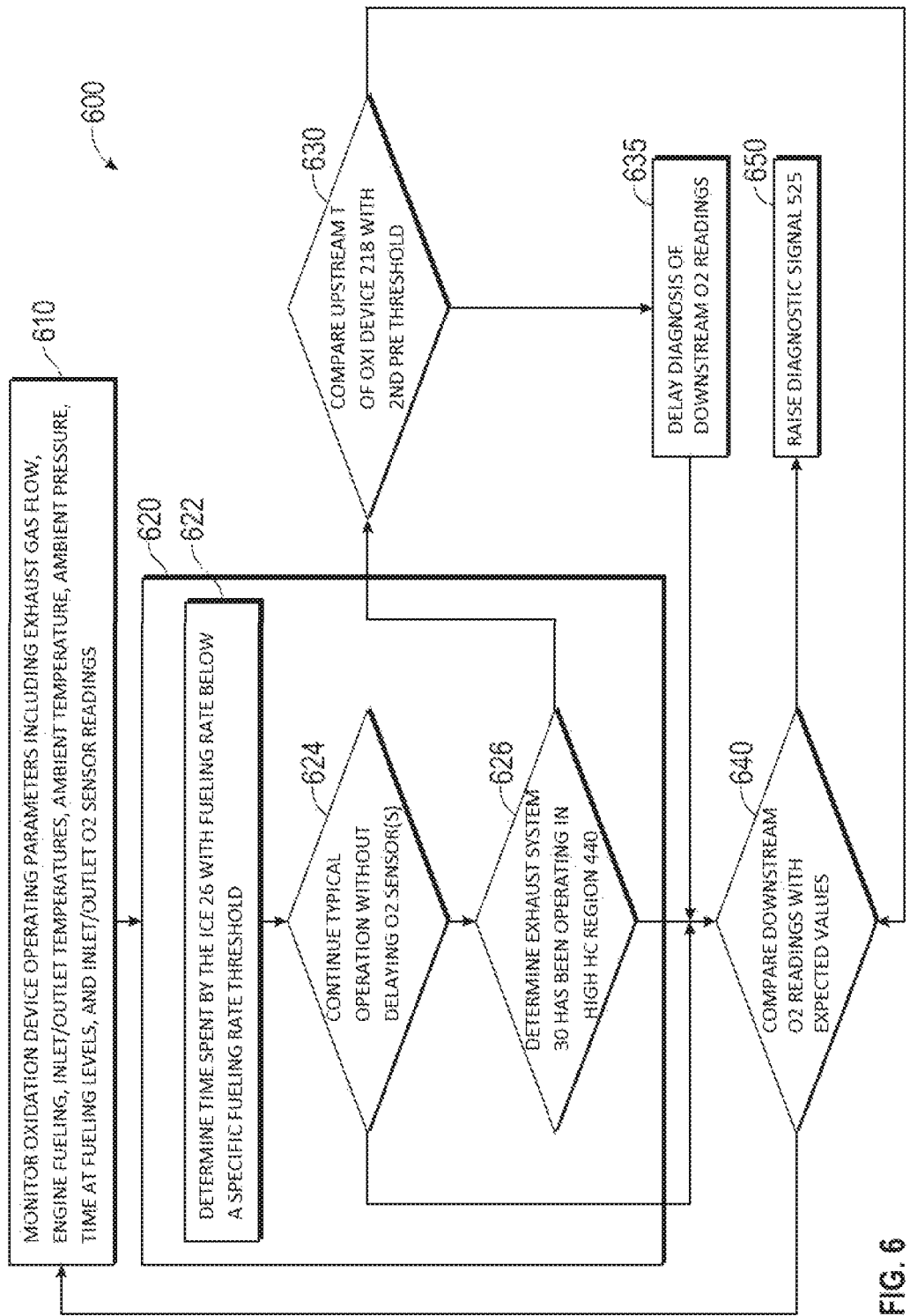
FIG. 6 illustrates a flow chart of an example method for delaying an $O_2$ sensor according to one or more embodiments.

FIG. 6 illustrates a flow chart of an example method 600 for delaying monitoring/using a measurement from an $O_2$ sensor according to one or more embodiments. The control module 238, in one or more examples, implements the method 600. The method 600 includes monitoring oxidation device operating parameters including exhaust gas flow, engine fueling, inlet/outlet temperatures, ambient temperature, ambient pressure, time at fueling levels, and inlet/outlet $O_2$ sensor readings, as shown at 610. Based on the operating parameters, the method 600 further includes determining if the exhaust system 30 is operating in high HC region, as shown at 620.

Determining if the exhaust system 30 is operating in high HC region includes determining time spent by the ICE 26 with fueling rate below a specific fueling rate threshold, as shown at 622. For example, if the vehicle 10 is being idled, or is traveling on a downward slope, the fueling rate of the ICE 26 can be below the fueling rate threshold. If the time spent below the fueling rate threshold exceeds a predetermined time-threshold, the method 600 further includes comparing exhaust gas temperature values with a predetermined temperature threshold (such as 100° F., and the like), as shown at 624 and 626.

If the time spent below the fueling rate threshold is within the predetermined time-threshold, the control module 238 deems that the exhaust system 30 is not operating in a high HC region and continues typical operation without delaying the $O_2$ sensor(s), as shown at 624. For example, the control module 238 compares downstream $O_2$ sensor readings with expected $O_2$ values from the oxidation device 218, the expected $O_2$ values determined based on the performance model of the oxidation device 218, as shown at 640. If the $O_2$ readings from the downstream $O_2$ sensor match the expected $O_2$ values, the control module 238 continues monitoring the operation of the exhaust system 30 by looping through the method. In one or more examples, the $O_2$ diagnosis module 112 raises the diagnostic signal 525 indicating that the oxidation system is working as expected. If the $O_2$ readings from the downstream $O_2$ sensor do not match the expected $O_2$ values, the $O_2$ diagnosis module 112 raises the diagnostic signal 525 indicating an error in the oxidation system, as shown at 650.

If the time spent in the low fueling rate exceeds the time-threshold, and if the exhaust gas temperature is below the temperature-threshold, the control module 238 determines that the exhaust system 30 has been operating in the high HC region 440, as shown at 624 and 626. Upon determining that the ICE 26 has been operating in the high HC region, the control module 238 determines if the high HC region operation has ended by comparing an upstream temperature of the oxidation device 218 with a second predetermined threshold, as shown at 630. The second predetermined threshold may be a value such as 230° F., 220° F., or any other such temperature value. The upstream temperature being above the second predetermined threshold indicates that the oxidation device 218 has started to warm up, because of an increase in the fueling rate in the ICE 26. If the upstream temperature has not increased above the second predetermined threshold value, the control module 238 continues to compare the downstream $O_2$ readings with the expected values, as shown at 640. It should be noted that in one or more example a measurement from the downstream sensor are compared with those from the upstream sensor to confirm the findings.

If the upstream temperature is above the second predetermined threshold value, the control module 238 delays the diagnosis of the downstream $O_2$ readings, as shown at 635. Thus, if the control module 238 detects a rise in the upstream temperature after the high HC region, the control module 238 delays capturing and/or analyzing measurements from the downstream $O_2$ sensor. The delaying the use of $O_2$ sensor readings for the diagnosis (i.e. comparison with expected $O_2$ values) is based on the signal rationality delay time. In one or more examples, the delaying causes the capture/analysis of the $O_2$ readings from the downstream $O_2$ sensor 248' to be delayed for the signal rationality delay time (which may be a predetermined amount of time), and after expiration of the signal rationality delay time, the control module 238 continues to capture/analyze the downstream $O_2$ sensor readings for the comparison, as shown at 640. Alternatively, or in addition, the signal rationality delay time is dynamically determined, for example, based on the state of the oxidation device 218.

The signal rationality delay time is measured since the determination of the upstream temperature being above the second predetermined threshold value. For example, a timer is initiated upon detecting the rise in the upstream temperature, the timer being for the signal rationality delay time. Upon expiration of the timer, the downstream $O_2$ readings are captured and compared with the expected values.

Alternatively, or in addition, the use of the $O_2$ readings is delayed for a predetermined number of iterations. For example, the control module 238 keeps track of a number of times the downstream $O_2$ readings have updated since determining the rise in the upstream temperature. Once the downstream $O_2$ readings have been updated at least a predetermined number of times, the control module 238 captures and uses the downstream $O_2$ readings for comparison with the expected values.

In one or more examples, during the signal rationality delay time, the control module 238 shuts off the $O_2$ diagnosis module 112 and switches the $O_2$ diagnosis module 112 back on after completion of the signal rationality delay time.

After the delaying, the control module 238 continues to operate as earlier, that is, to capture the downstream O2 readings, comparing those with the expected O2 values, and raising the notification 525 based on the values matching/not matching. By delaying the use of the downstream O2 sensor readings, the control module 238 prevents false error signal from being raised by the notification 525 after the overrun condition has occurred. In the overrun conditions a vehicle with an SCR system may be diagnosed for downstream O2 sensor performance because during such overruns fueling is very light (downhill, long idle), causing the engine out HC to be high and the exhaust system to cool off. Such conditions, in turn cause HC to store in the oxidation device 218, and subsequently, when the ICE 26 returns to a higher load the oxidation device 218 warms up and the stored HC is oxidized. While this is occurring, the downstream O2 readings have lower than anticipated values due to the HC burning off the oxidation device. Thus, by delaying the use of the O2 readings, such lower than anticipated values are not used for the comparison, preventing the false error signal from being raised.

Although the method is illustrated as ending after raising an error notification, it is appreciated that the method may return to operation after determining a pass or fail event to continue monitoring for subsequent overrun conditions.

The technical solutions described herein facilitate improvements to emissions control systems used in combustion engines, such as those used in vehicles. For example, the technical solutions facilitate identifying conditions where HC will be deposited on the oxidation device. For example, the conditions may include low fueling, low exhaust gas temp, high altitude, etc. followed by a rise in downstream oxidation temp above (or nearly above) upstream oxidation temperature, while the upstream oxidation temperature is falling. Upon detection of such an event, a de-bounce timer is initiated, which disables diagnostic of comparing downstream $O_2$ readings with anticipated values for a certain period of time. Such elimination of false diagnostic failure signals under these conditions, in turn facilitate reducing the volume of sensor replacements when the components are not faulted.

It should be noted that although the technical solutions herein are described in the context of a diesel based internal combustion engine, the technical solutions are applicable to any internal combustion engine that uses any type of fuel and uses an exhaust system with an oxygen sensor as is described herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
    an oxidation device;
    an O2 diagnosis module configured to diagnose the oxidation device; and
    a controller that is configured to manage the O2 diagnosis module by:
        detecting a high hydrocarbon region in the operation of the internal combustion engine;
        responsively, measuring an upstream temperature of the oxidation device; and
        in response to the upstream temperature being above a predetermined threshold, delaying the O2 diagnosis module for a signal rationality delay time.

2. The emissions control system of claim 1, wherein delaying the O2 diagnosis module comprises switching the O2 diagnosis module off for the signal rationality delay time.

3. The emissions control system of claim 1, wherein the signal rationality delay time is a predetermined amount of time.

4. The emissions control system of claim 1, wherein the signal rationality delay time is determined based on a state of the oxidation device.

5. The emissions control system of claim 4, wherein determining the signal rationality delay time comprises accessing a look-up table corresponding to an oxidation device performance.

6. The emissions control system of claim 1, wherein detecting the high hydrocarbon region comprises:
   detecting a fueling rate of the internal combustion engine being below a predetermined threshold.

7. The emissions control system of claim 6, wherein detecting the high hydrocarbon region further comprises:
   detecting that the upstream temperature is below a second predetermined threshold.

8. An exhaust system for treating exhaust gas emitted by an internal combustion engine, configured to perform a selective catalytic reduction (SCR) of exhaust gas, the exhaust system comprising:
   an $O_2$ diagnosis module configured to diagnose oxidation performance of the exhaust system; and
   a controller configured to govern the exhaust system by:
      detecting a high hydrocarbon region in the operation of the internal combustion engine;
      responsively, measuring an upstream temperature of an oxidation device of the exhaust system; and
      in response to the upstream temperature exceeding a predetermined threshold, delaying the diagnosis module for a signal rationality delay time.

9. The exhaust system of claim 8, wherein delaying the $O_2$ diagnosis module comprises switching the $O_2$ diagnosis module off for the signal rationality delay time.

10. The exhaust system of claim 8, wherein the signal rationality delay time is a predetermined amount of time.

11. The exhaust system of claim 8, wherein the signal rationality delay time is determined based on a state of the oxidation device.

12. The exhaust system of claim 8, wherein detecting the high hydrocarbon region comprises:
   detecting a fueling rate of the internal combustion engine being below a predetermined threshold.

13. The exhaust system of claim 12, wherein detecting the high hydrocarbon region further comprises:
   detecting that the upstream temperature is below a second predetermined threshold.

14. The exhaust system of claim 13, wherein the high hydrocarbon region is caused by idling of the internal combustion engine.

15. A computer-implemented method for controlling an exhaust system of an internal combustion engine, the method comprising:
   detecting a high hydrocarbon region in the operation of the internal combustion engine;
   responsively, measuring an upstream temperature of an oxidation device of the exhaust system; and
   in response to the upstream temperature being equal to or above a predetermined threshold, delaying an O2 diagnosis of the exhaust system for a signal rationality delay time.

16. The method of claim 15, wherein delaying the O2 diagnosis comprises switching an O2 diagnosis module of the exhaust system off for the signal rationality delay time.

17. The method of claim 15, wherein the signal rationality delay time is determined based on a state of the oxidation device.

18. The method of claim 15, wherein detecting the high hydrocarbon region comprises:
   detecting a fueling rate of the internal combustion engine being below a predetermined threshold.

19. The method of claim 18, wherein detecting the high hydrocarbon region further comprises:
   detecting that the upstream temperature is below a second predetermined threshold.

20. The method of claim 19, wherein the high hydrocarbon region is caused by idling of the internal combustion engine.

* * * * *